United States Patent Office 2,940,987
Patented June 14, 1960

2,940,987

REGENERATION OF DEGRADED ANTHRAQUINONE WORKING SOLUTIONS USED FOR PRODUCING HYDROGEN PEROXIDE

Carl W. Eller, Jr., and James M. Snyder, Memphis, Tenn., assignors to E. I. du Pont de Nemours and Company, Wilmington, Del., a corporation of Delaware No Drawing. Filed May 24, 1957, Ser. No. 661,282

13 Claims. (Cl. 260—369)

This invention relates to anthraquinone working solutions used in cyclic reduction and oxidation operations for the production of hydrogen peroxide. More particularly, it relates to a treatment of such solutions which have become degraded through such use, whereby to increase the peroxide synthesizing capacity of the solution.

Cyclic processes of the above type for producing hydrogen peroxide are well-known. They generally involve the catalytic reduction of an anthraquinone and the subsequent oxidation of the resulting anthrahydroquinone to reform the anthraquinone for recycling after recovering the hydrogen peroxide simultaneously produced. The anthraquinone compound is employed in the form of a solution (the working solution) in a water-immiscible organic solvent. Many anthraquinone compounds (including tetrahydroanthraquinones) have been proposed as working intermediates, particularly the alkylanthraquinones having a lower alkyl group in the 2-position of the anthraquinone structure. Many mixed and single component solvents have been proposed as working solvents for the anthraquinone intermediates. So far as the present invention is concerned the working solution may comprise any of the anthraquinone intermediates and solvents or mixtures of solvents heretofore known to be suitable for use in processes of the above type.

It is also well-known that continued use of a working solution in the cyclic operations for the production of hydrogen peroxide results in degradation of the working solution with the production of anthraquinone degradation products which have no utility in synthesizing hydrogen peroxide. These degradation products are of two general types: (1) regenerable inert compounds, i.e., those which can be reconverted to anthraquinones useful in synthesizing hydrogen peroxide; and (2) nonregenerable inert compounds, i.e., those which cannot readily be regenerated to anthraquinone compounds useful in synthesizing hydrogen peroxide. Methods for successfully regenerating degraded working solutions whereby the regenerable inert degradation products are reconverted to useful anthraquinone compounds are of obvious practical value.

It is an object of the invention to provide a practical method for regenerating working solutions which have become degraded through use in processes of the above type. A further object is the provision of a simple yet practical method for treating such degraded solutions whereby the regenerable inert degradation products, or at least a substantial portion thereof, are reconverted to compounds useful in synthesizing hydrogen peroxide. Still further objects will be apparent from the following description.

The objects of the invention are accomplished by subjecting a working solution which has become degraded through use in cyclic operations to produce hydrogen peroxide to the action of free or elemental oxygen at a temperature of at least 95° C. but not sufficiently high to cause pyrolysis of the essential components (anthraquinone and solvent) of the working solution. In a preferred embodiment of the invention, treatment of the degraded working solution with oxygen is effected in the presence of a surface active catalyst.

The maximum temperature permissible for the treatment with oxygen will vary depending upon the specific working solution being treated, since its heat stability will depend somewhat upon the specific anthraquinone and solvent present. However, temperatures of 95 to 300° C. are generally usable while those ranging from 125 to 200° C. are preferred. Temperatures below 95° C. are generally ineffective or require such a long time as to be impractical.

It has been found that regeneration of regenerable inert materials is substantially increased by having free oxygen present during the heating treatment. On the other hand, no similar beneficial effect is obtained when oxygen is replaced by carbon dioxide or nitrogen.

The rate of regeneration and, in some instances, the degree of regeneration can be increased, and the temperature of operation can be reduced, by carrying out the treatment with oxygen in the presence of a solid contact material, preferably a surface active solid having a microporous structure such as silica gel, activated carbon, activated alumina, active magnesia; palladium or platinum on a silica gel, activated alumina, active magnesia, or activated carbon support; and supported nickel, iron and cobalt catalysts. Such a catalyst, if used, will generally be employed in amounts equal to from 1 to about 50% preferably 5 to 30%, of the weight of the working solution. Smaller and larger amounts can also be used.

Air is a convenient source of oxygen for the present purpose, although other gases containing free or elemental oxygen and devoid of other reactive components can be used. The oxygen content of the treating gas generally should be at least 1% and may be as high as 100%, concentrations of 5 to 25% being preferred. Air is entirely satisfactory and is preferred for economic reasons.

Effective regeneration can be accomplished simply by passing through the working solution maintained at a proper temperature a stream of the oxygen-containing gas at a rate sufficient to maintain an oxidizing atmosphere during the time of the treatment. A slow stream of air passed through the heated solution for from 0.25 to 10 hours is generally effective. However, the optimum time will depend upon the treatment temperature, since the rate of regeneration increases as the temperature is increased. Under preferred temperature conditions, treating times of 0.5 to 5 hours are usually preferred.

The invention is illustrated by the following examples in which all concentrations are expressed as percentages by weight unless indicated to be otherwise.

*Example 1*

A working solution which had become degraded through use in cyclic reduction and oxidation operations to produce hydrogen peroxide contained 11.8% usable anthraquinones (2-t-butylanthraquinone and the corresponding tetrahydro compound) and 8.2% inert degradation products dissolved in a mixture of α-methylnaphthalene and diisobutylcarbinol. A slow stream of air was passed through a portion of the degraded solution for 2 hours while the solution was maintained at 175° C. The treatment converted 16% of the inert materials originally present to anthraquinone compounds useful in synthesizing hydrogen peroxide. In a repeat experiment, 18% of the inert materials were so converted.

When a sample of the above degraded solution was heated for 2 hours at 175° C. under a blanket of carbon dioxide, only 4% of the inert materials were converted to useful compounds. When nitrogen was substituted for air, the conversion was only 0.7%.

When the above treatment with air was repeated at 100° C. for 2 and 5 hours (2 experiments) the conversions were 7.7 and 17.3%, respectively.

*Example 2*

A degraded working solution similar to that of Example 1 but containing 12.7% usable anthraquinones and 8.4% inert degradation products was treated with a stream of air for 2 hours at 175° C. The conversion of inert materials to useful anthraquinones was 11%.

*Example 3*

A degraded working solution similar to that of Example 1 but containing 11.9% usable anthraquinones and 7.1% of inert degradation products was mixed with 20% of its weight of 150–200 mesh activated alumina. Heating the mixture for 0.5 hour at 150° C. while a stream of air was passed through it at a rate sufficient to suspend the catalyst, resulted in a conversion of 8% of the inert materials to useful anthraquinones. Treatment under the same conditions for 1 hour resulted in a 10.2% conversion.

Repetition of the above procedure using in place of activated alumina, a catalyst comprising 2.5% metallic palladium on 150–200 mesh activated alumina resulted in 13 and 18% conversions for treatments of 1 and 3 hours, respectively.

*Example 4*

A degraded working solution similar to that of Example 1 and containing 11.11% anthraquinones and 7.07% inerts was mixed with 20% of its weight of activated alumina and the mixture heated 2 hours at 100° C. in an oxygen atmosphere. This treatment converted 9.33% of the inerts to useful anthraquinones. A similar treatment in a nitrogen atmosphere gave a conversion of only 0.9%.

*Example 5*

A degraded working solution similar to that of Example 1 and containing the same percentages of anthraquinones and inert degradation products was mixed with 25% of its weight of a palladium-on-alumina catalyst similar to that of Example 3. A stream of air sufficient to suspend the catalyst was passed through the mixture for 2 hours at 175° C. The conversion of inert materials to useful anthraquinones was 14%. In two similar experiments conversions of 21 and 25% were obtained. In a similar experiment at 200° C., the conversion was 28%.

*Example 6*

A degraded working solution similar to that of Example 1 and containing the same percentages of anthraquinones and inert degradation products was mixed with 25% of its weight of a supported nickel oxide catalyst containing the equivalent of 46% nickel and a small amount of an iron oxide. The mixture was heated at 175° C. for 2 hours while the catalyst was suspended with a stream of air. The resulting conversion of inert materials to useful anthraquinones was 24%. A similar treatment at 200° C. resulted in a conversion of 35%. A similar treatment at 175° C. but employing nitrogen instead of air resulted in no regeneration of the inert degradation products; in fact, 0.8% of the useful anthraquinones originally present were converted to inert degradation products as a result of the treatment.

The method of the invention is applicable generally to the regeneration of any working solution of an anthraquinone intermediate which has become degraded through use in cyclic operations for the production of hydrogen peroxide. The method can be usefully employed to regenerate periodically all of the working solution in the hydrogen peroxide synthesis system. Alternatively, a portion of the working solution may be periodically or continuously withdrawn, regenerated in accordance with the invention, then returned to the system.

We claim:

1. The method of regenerating a working solution of an anthraquinone in a water-immiscible solvent, said solution having become degraded through use in cyclic reduction and oxidation operations for the production of hydrogen peroxide, said method comprising continuously passing a gas containing free oxygen through the degraded solution while said degraded solution is heated to a temperature of from 95 to 300° C., said gas having a free oxygen content of 1 to 100% and being devoid of any component other than said free oxygen which is reactive under the conditions employed.

2. The method of claim 1 wherein the working solution is a solution of 2-t-butylanthraquinone and tetrahydro-2-t-butylanthraquinone.

3. The method of claim 1 wherein the temperature is in the range 125 to 200° C.

4. The method of claim 1 wherein the gas is air.

5. The method of regenerating a working solution of an anthraquinone in a water-immiscible solvent, said solution having become degraded through use in cyclic reduction and oxidation operations for the production of hydrogen peroxide, said method comprising continuously passing a gas containing free oxygen through the degraded solution while said degraded solution is heated to a temperature of from 95 to 300° C. in the presence of a catalyst comprising a surface active solid contact material having a microporous structure, said gas having a free oxygen content of 1 to 100% and being devoid of any component other than said free oxygen which is reactive under the conditions employed.

6. The method of claim 5 wherein the working solution is a solution of 2-t-butylanthraquinone and tetrahydro-2-t-butylanthraquinone.

7. The method of claim 5 employing an activated alumina catalyst.

8. The method of claim 5 employing as catalyst metallic palladium on activated alumina.

9. The method of claim 5 employing a nickel catalyst.

10. The method of claim 7 wherein the temperature is in the range 125 to 200° C.

11. The method of claim 8 wherein the temperature is in the range 125 to 200° C.

12. The method of claim 9 wherein the temperature is in the range 125 to 200° C.

13. The method of claim 5 wherein the gas is air.

References Cited in the file of this patent

UNITED STATES PATENTS 2,739,875    Sprauer _____ Mar. 27, 1956